(12) United States Patent
Case et al.

(10) Patent No.: US 7,686,518 B2
(45) Date of Patent: Mar. 30, 2010

(54) SHUTTERED ADAPTER

(75) Inventors: Richard L. Case, Omaha, NE (US);
Timothy W. Anderson, Omaha, NE (US)

(73) Assignee: CommScope, Inc. of North Carolina, Hickory, NC (US)

( * ) Notice: Subject to any disclaimer, the term of this patent is extended or adjusted under 35 U.S.C. 154(b) by 0 days.

(21) Appl. No.: 12/233,265

(22) Filed: Sep. 18, 2008

(65) Prior Publication Data

US 2009/0074359 A1 Mar. 19, 2009

Related U.S. Application Data

(60) Provisional application No. 60/973,627, filed on Sep. 19, 2007.

(51) Int. Cl.
*G02B 6/36* (2006.01)
(52) U.S. Cl. .................. 385/53; 385/77; 385/139; 439/138
(58) Field of Classification Search ............. 385/53–55, 385/58, 70, 77, 92, 139; 439/138–140
See application file for complete search history.

(56) References Cited

U.S. PATENT DOCUMENTS

| 5,716,224 | A | 2/1998 | Masuda et al. |
|---|---|---|---|
| 6,425,694 | B1 | 7/2002 | Szilagyi et al. |
| 6,715,930 | B2 | 4/2004 | McBride |
| 7,029,322 | B2 * | 4/2006 | Ernst et al. ................. 439/544 |
| 7,340,146 | B2 | 3/2008 | Lampert et al. |
| 7,542,732 | B2 * | 6/2009 | Ka ............................. 455/90.3 |
| 2004/0062486 | A1 * | 4/2004 | Tanaka et al. ................. 385/55 |
| 2006/0029333 | A1 * | 2/2006 | Yang ............................ 385/53 |

* cited by examiner

*Primary Examiner*—Hemang Sanghavi
(74) *Attorney, Agent, or Firm*—Muncy, Geissler, Olds & Lowe, PLLC

(57) ABSTRACT

A shuttered adapter for a communications connector is formed of two pieces in the form of a retainer and a door. The retainer is formed of plastic and includes facing resilient lips for snap-on attachment to a connector body. A resilient tab and a first hinge portion are integrally formed as features of the retainer during an initial molding process of the retainer. The door is formed of plastic and includes a second hinge portion integrally formed therewith during an initial molding process of the door. The second hinge portion is attached to the first hinge portion to permit the door to pivot relative to the retainer. The resilient tab contacts a top of the door to urge the door into a position covering an opening in the connector for receiving a mating connector.

20 Claims, 6 Drawing Sheets

SHUTTERED ADAPTER

This application claims the benefit of U.S. Provisional Application No. 60/973,627, filed Sep. 19, 2007, the entire contents of which are herein incorporated by reference.

BACKGROUND OF THE INVENTION

1. Field of the Invention

The present invention relates to a shuttered adapter. More precisely, the present invention relates to a cover or door (and a mounting device or retainer to hold the door to a connector) which blocks access to the connector (e.g., a jack or an adapter or other piece of equipment) when a mating connector (e.g. a plug) is not present in the connector. Shuttered jacks or adapters are especially useful with a fiber optic connector to prevent debris from entering into the fiber optic connector and to prevent dangerous laser light from escaping from an unmated connector, which could potentially damage the eyesight of a person. However, a shuttered adapter may be used with other types of connectors, such as connectors for twisted pair cables (e.g. RJ-type jacks) by keeping an unmated connector clean in a dusty environment.

2. Description of the Related Art

Typical shuttered adapters, in accordance with the prior art, are complex to manufacture and assemble due to multiple parts. A typical shuttered adapter has a plastic door with molded-in hinges that receive a separate metal axle and a separate spring. For example, FIG. 1 illustrates a shuttered adapter 1 which has been offered for sale by the assignee of the present application for more than one year.

The shuttered adapter 1 in FIG. 1 is a duplex LC adapter formed of a plastic body 2. A metal retainer 3 wraps around a perimeter of the plastic body 2 and may be held onto the plastic body by one or more spring clips 4.

First and second metal loops 5 are formed as a part of the metal retainer 3. A metal hinge pin 6 passes through the first and second metal loops 5. The metal hinge pin 6 also passes though first and second plastic hooks or loops 7. The plastic loops 7 are integrally molded with a plastic door 8. By the stated arrangement, the plastic door 8 is pivotably mounted to the metal retainer 3, which is in turn fixed to the plastic body 2 of the adapter 1.

A metal spring 12 is helically wound about the metal hinge pin 6 between the first and second metal loops 5. A first end of the metal spring 12 is fixed to, or abuts, the metal retainer 3. An opposite end 14 of the metal spring 12 abuts the plastic door 8. The metal spring 12 applies a resilient force to the plastic door 8, which tends to keep the plastic door 8 in its closed state, as illustrated in FIG. 1. However, a user may manually open the door 8 against the biasing force of the spring 12 to insert a mating connector into the adapter 1.

An additional metal retainer 10 with additional clips 9 may optionally be attached to the plastic body 2 of the adapter 1. The additional clips 9 permit the adapter 1 to be secured to a secondary object, like a patch panel or an opening of an I/O port of a piece of equipment.

U.S. Pat. Nos. 5,716,224; 6,425,694; 6,715,930 and 7,340,146, each of which is incorporated herein by reference, illustrate various constructions for typical shuttered adapters.

SUMMARY OF THE INVENTION

The Applicants have appreciated one or more drawbacks associated with the designs of the background art. For example, the shuttered adapters of the background art require many parts, which increase the cost of the adapter. The prior art of FIG. 1 required the production and assembly of at least four distinct parts, e.g., the retainer 3, the door 8, the hinge pin 6 and the spring 12. The Applicants desired an adapter with fewer parts, which is less complex to manufacture, install and/or service. Further, the Applicants appreciated that the presence of metal parts in the typical shuttered adapter can be disadvantageous in certain end applications (e.g. salt water atmospheres, strong electromagnetic or static electric fields).

To address these and other concerns, the Applicants have invented a new construction for a shuttered adapter. In a preferred embodiment, the shuttered adapter is formed of two plastic pieces, which may be formed by straight-pull molding processes using molding tools without slides. The construction of the present invention is more simplistic in that one or more parts are eliminated (e.g., the metal axle, the metal spring), while the overall functionality of a shuttered adapter is retained. Moreover, construction costs of the shuttered adapter are reduced and the end product is more intuitive and simple in design.

These and other objects are accomplished by a shuttered adapter for a communications connector, which is formed of two pieces in the form of a retainer and a door. The retainer is formed of plastic and includes facing resilient lips for snap-on attachment to a connector body. A resilient tab and a first hinge portion are integrally formed as features of the retainer during an initial molding process of the retainer. The door is formed of plastic and includes a second hinge portion integrally formed therewith during an initial molding process of the door. The second hinge portion is attached to the first hinge portion to permit the door to pivot relative to the retainer. The resilient tab contacts a top of the door to urge the door into a position blocking access to an opening in the connector for receiving a mating connector.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limits of the present invention, and wherein.

DETAILED DESCRIPTION OF THE INVENTION

Figure 1:
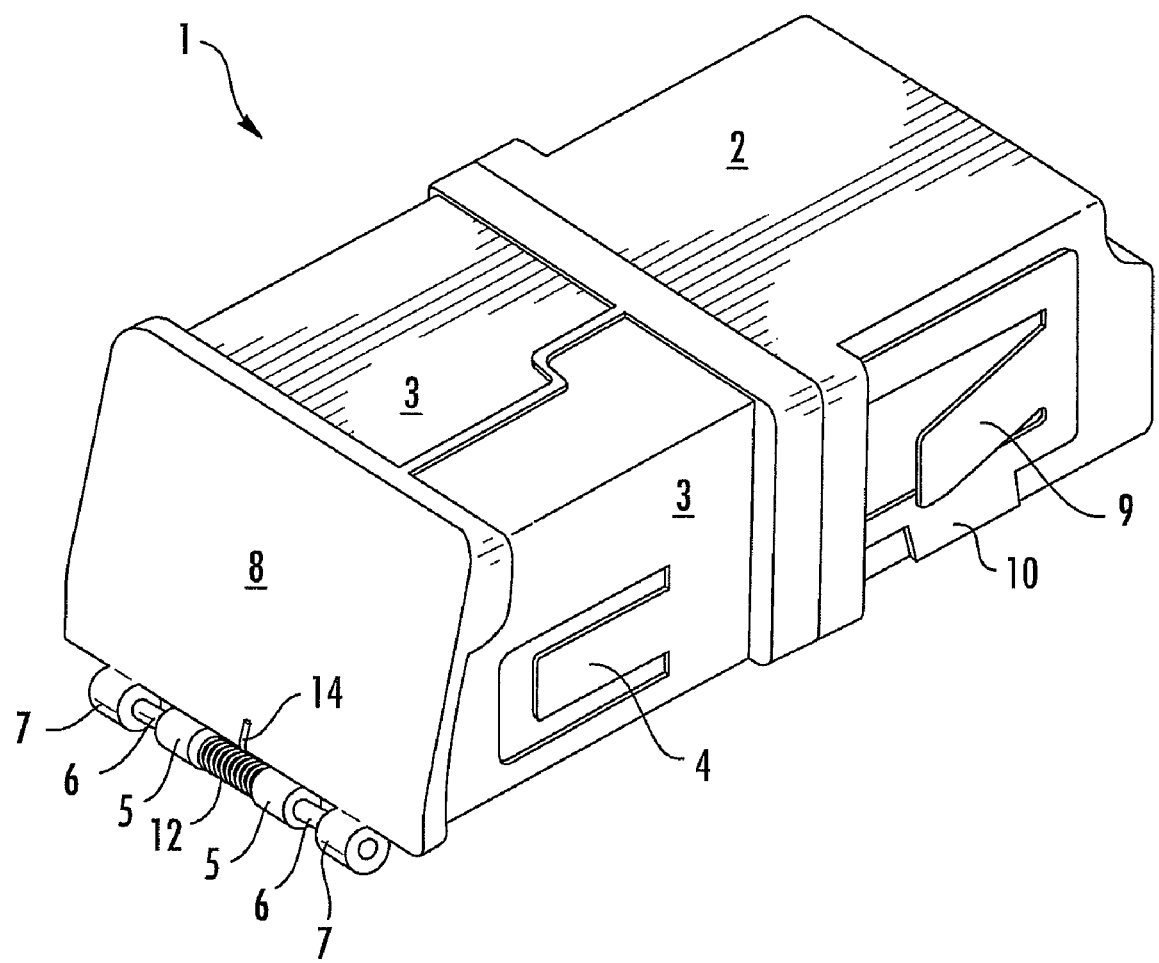
FIG. 1 is a front perspective view of a shuttered adapter, in accordance with the prior art.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity. Broken lines illustrate optional features or operations unless specified otherwise.

The terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "lateral", "left", "right" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. The device may be otherwise oriented (rotated 90 degrees or at other orientations) and the descriptors of relative spatial relationships used herein interpreted accordingly.

Figure 2:
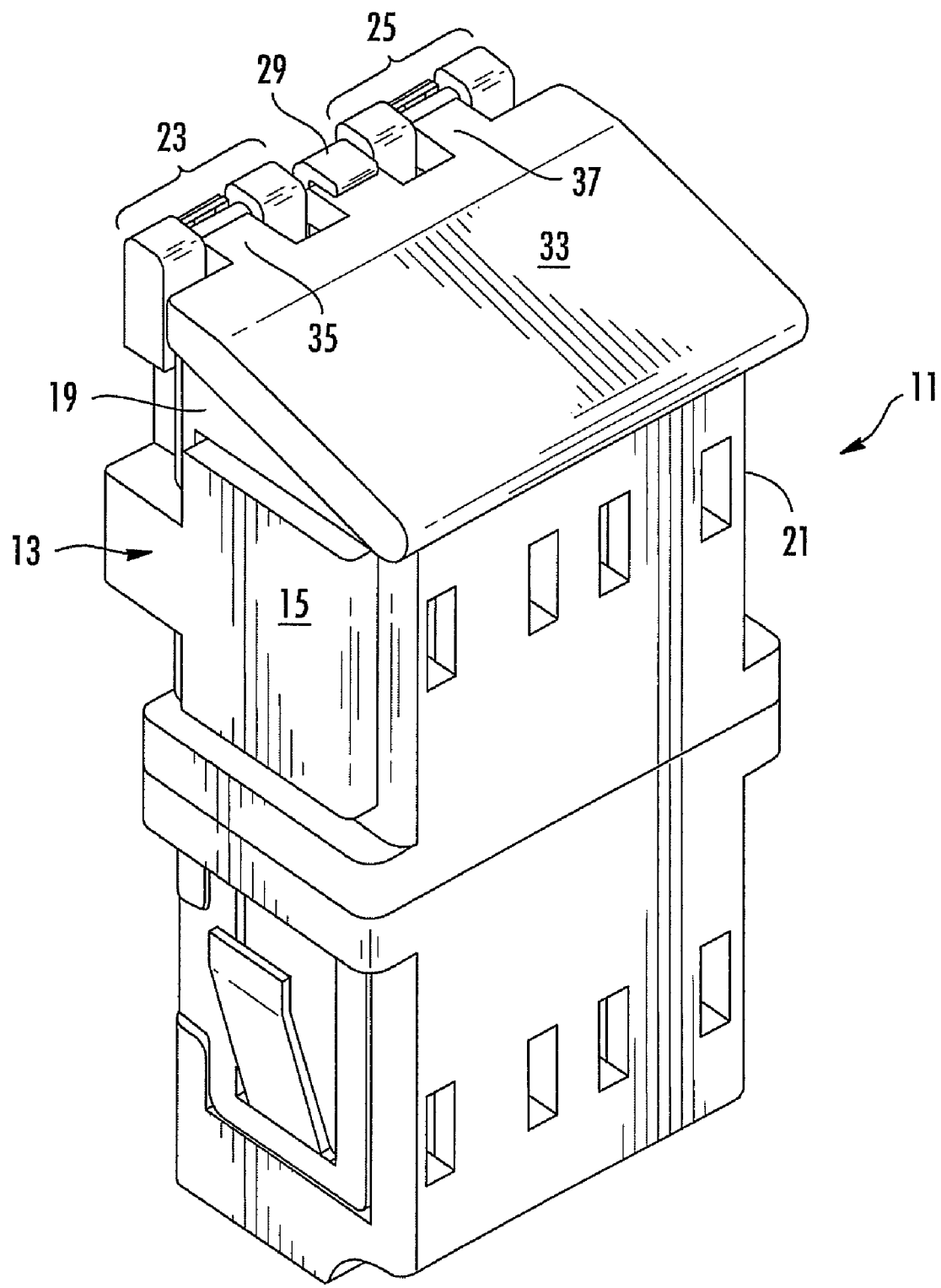
FIG. 2 is a front perspective view of a shuttered adapter with a door closing the adapter, in accordance with the present invention.
Figure 3:
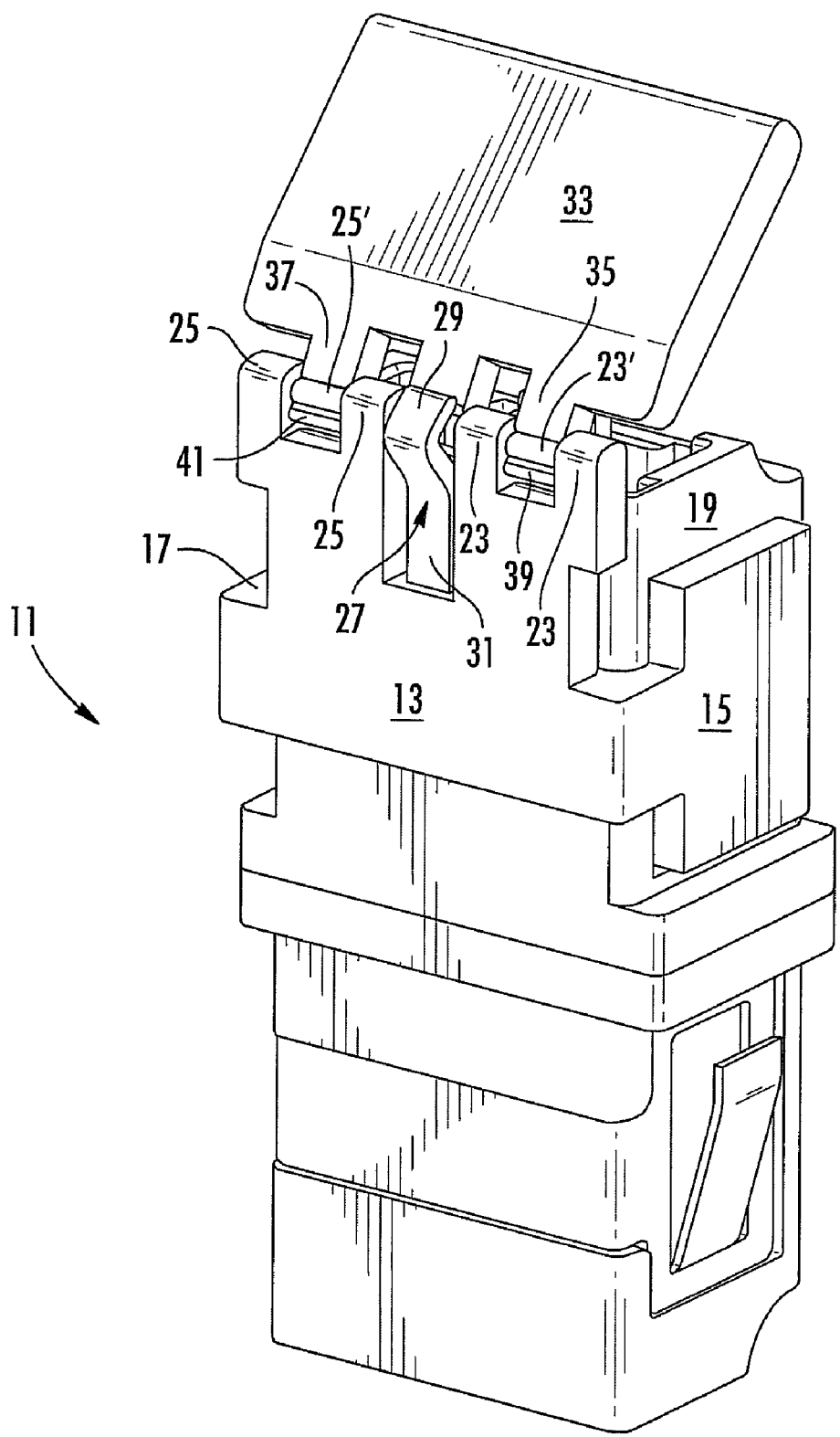
FIG. 3 is a rear perspective view of the shuttered adapter of FIG. 2 with the door partially open.

FIGS. 2 and 3 are front and rear perspective views of a shutter assembly for a communications connector, in accordance with the present invention. In FIGS. 2 and 3, the communications connector is illustrated as a duplex LC adapter 11. The adapter 11 includes a connector body presenting an opening for receiving a mating fiber optic connector. However, other types of connectors for receiving other types of mating connectors could enjoy the benefits of the present invention.

A plastic retainer 13 is attached to the adapter 11 by a snap-clip action. In other words, to install the retainer 13, first and second lateral facing lips 15 and 17 of the retainer 13 are slightly deformed to pass over opposing sidewalls 19 and 21 of the adapter 11. The natural resiliency of the plastic material forming the lips 15 and 17 will cause the lips 15 and 17 to press against and respectively engage the opposing sidewalls 19 and 21 of the adapter 11. Moreover, as the retainer 13 is fully seated onto the adapter 11, internal projections formed on portions of the lips 15 and 18 facing the opposing sidewalls 19 and 21 may engage into recesses formed within the opposing sidewalls 19 and 21 of the adapter 11 to secure the retainer 13 to the adapter 11, in a snap-locking fashion.

Figure 5:
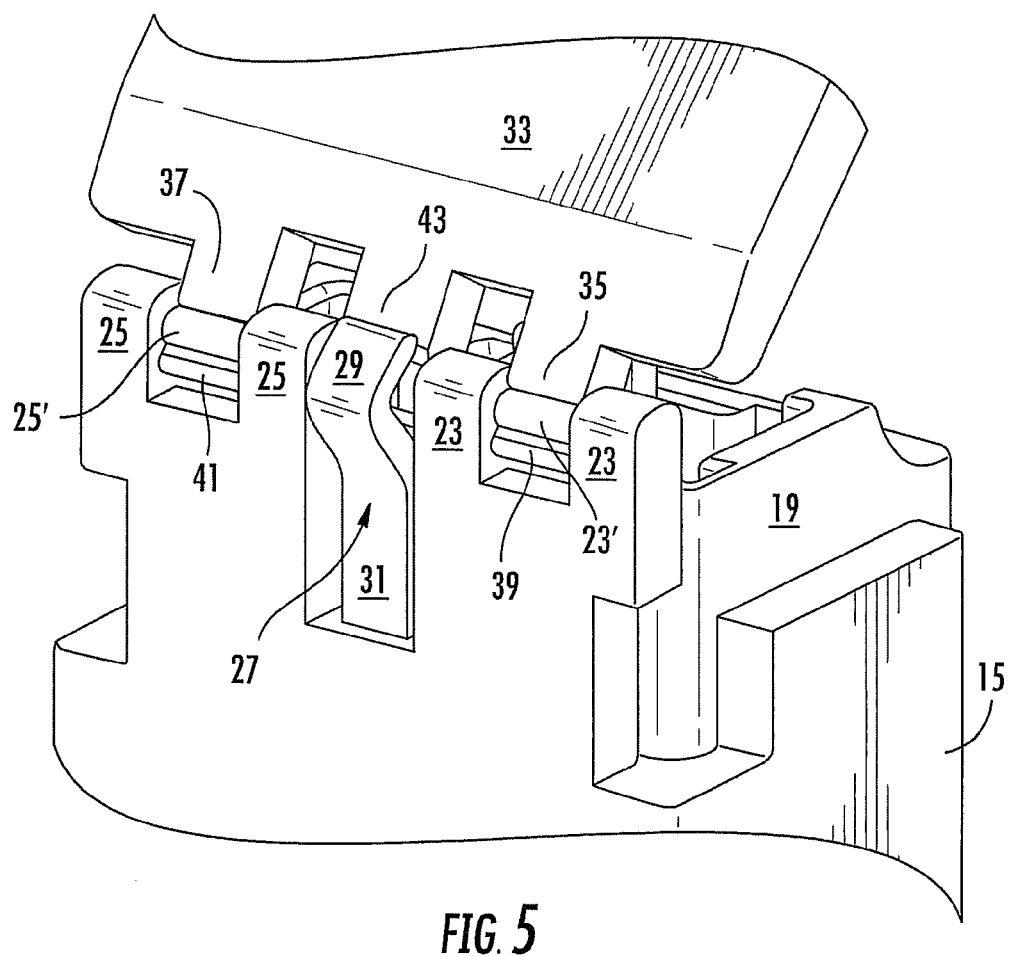
FIG. 5 is a rear, close-up perspective view of the hinge assembly existing between the door and the retainer in FIG. 3.

A top end of the retainer 13 includes at least one first hinge portion. In one embodiment, the at least one first hinge portion includes first and second molded axle hinges 23 and 25, which are integrally formed with the retainer 13 during an initial molding process of the retainer 13. A resilient tab 27 is also integrally formed as a feature of the retainer 13 during the initial molding process of the retainer 13. The resilient tab 27 act as a cantilever spring and is positioned between the first and second axle hinges 23 and 25, as best seen in FIGS. 3 and 5.

Figure 4:
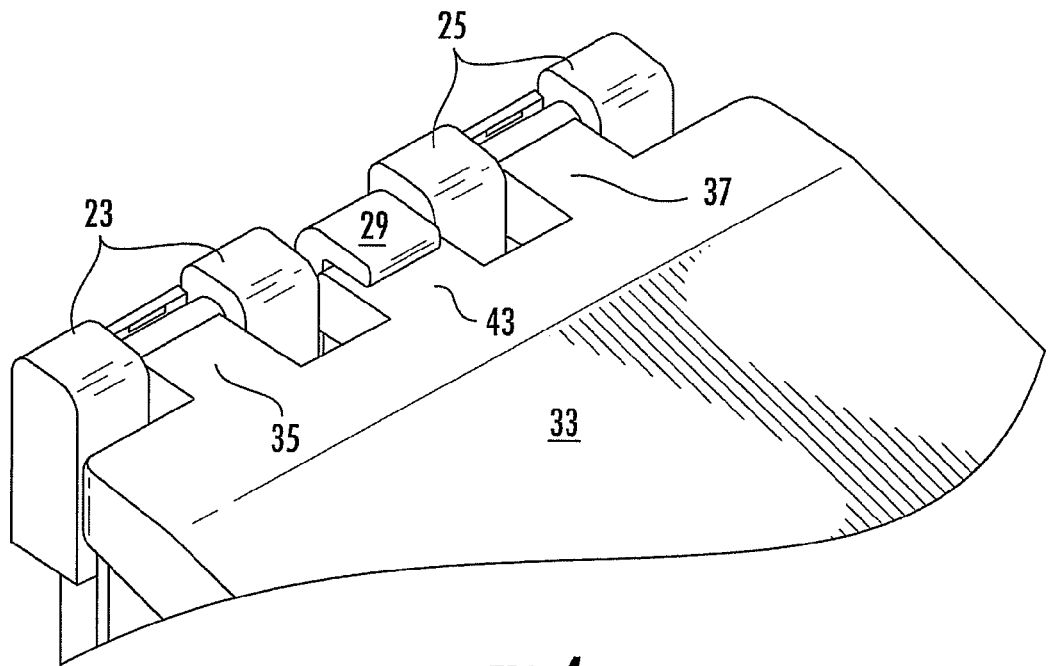
FIG. 4 is a front, close-up perspective view of the hinge assembly existing between the door and a retainer in FIG. 2.

The resilient tab 27 has a bent tip 29 proximate its distal end. A shaft 31 of the resilient tab 27 extends from the connection to the body of the retainer 13 to the bent tip 29. The plastic material forming the shaft 31 has a natural resiliency, which allows the resilient tab 27 to be bent slightly rearward (away from the adapter 11) and which causes the resilient tab 27 to resist such a movement and to seek to return to its substantially unbent state (as shown in FIGS. 2 and 4).

Figure 8:
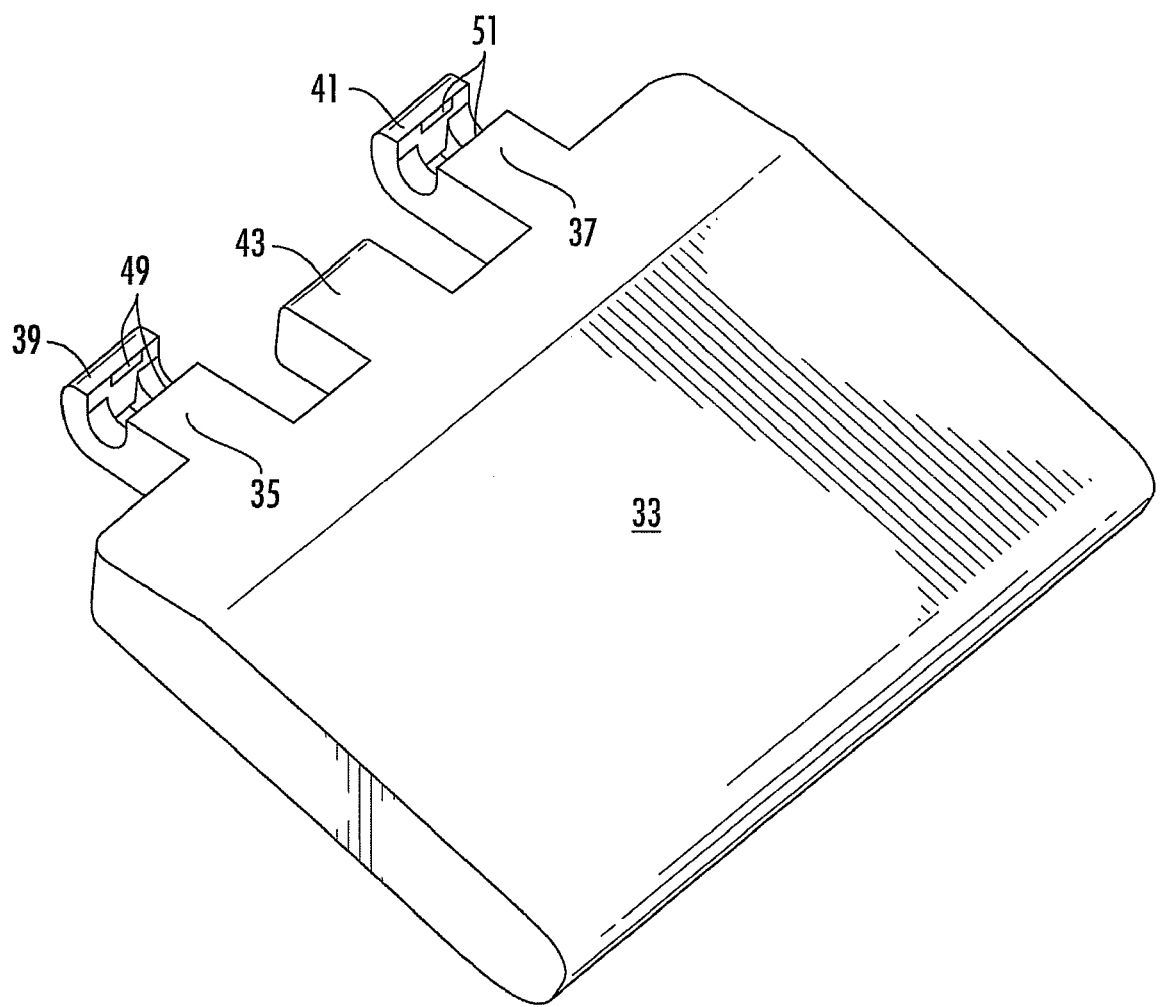
FIG. 8 is a perspective view of the door of the present invention.

A plastic door 33 (as best seen in FIG. 8) is a generally flat rectangular plate. The door 33 includes at least one second hinge portion integrally formed as a feature of the door 33 during an initial molding process of the door 33. In one embodiment, the at least one second hinge portion includes first and second lateral projections 35 and 37 terminating with gripping portions 39 and 41. The gripping portions 39 and 41 have cross sectional shapes that are semi-circular, e.g., approximately half-circles. The gripping portions 39 and 41 are sized to snap over cylindrical portions 23' and 25' of the first and second axle hinges 23 and 25 to attach the door 33 to the retainer 13 to permit the door 33 to pivot relative to the retainer 13. The gripping portions 39 and 41 may optionally include built out nibs 49 and 51 to assist in snapping over the cylindrical portions 23' and 25'. A middle projection 43 is formed between the first and second lateral projections 35 and 37. The middle projection 43 does not include a gripping portion.

When the door 33 is attached to the retainer 13, the bent tip 29 of the resilient tab 27 contacts or engages a portion of the door 33, such as a top surface of the middle projection 43 of the door 33. Alternately or additionally, an inside portion of the shaft 31 immediately adjacent to the bent tip 29 contacts or engages a distal end of the middle projection 43. The engagement between the resilient tab 27 and the middle projection 43 urges the door 33 to assume it's closed, first position relative to the retainer 13 and adapter 11 (e.g., FIGS. 2 and 4) and to resist movement to an open position relative to the retainer 13 and adapter 11 (e.g., FIGS. 3, 5, 6 and 7).

Figures 6, 7:
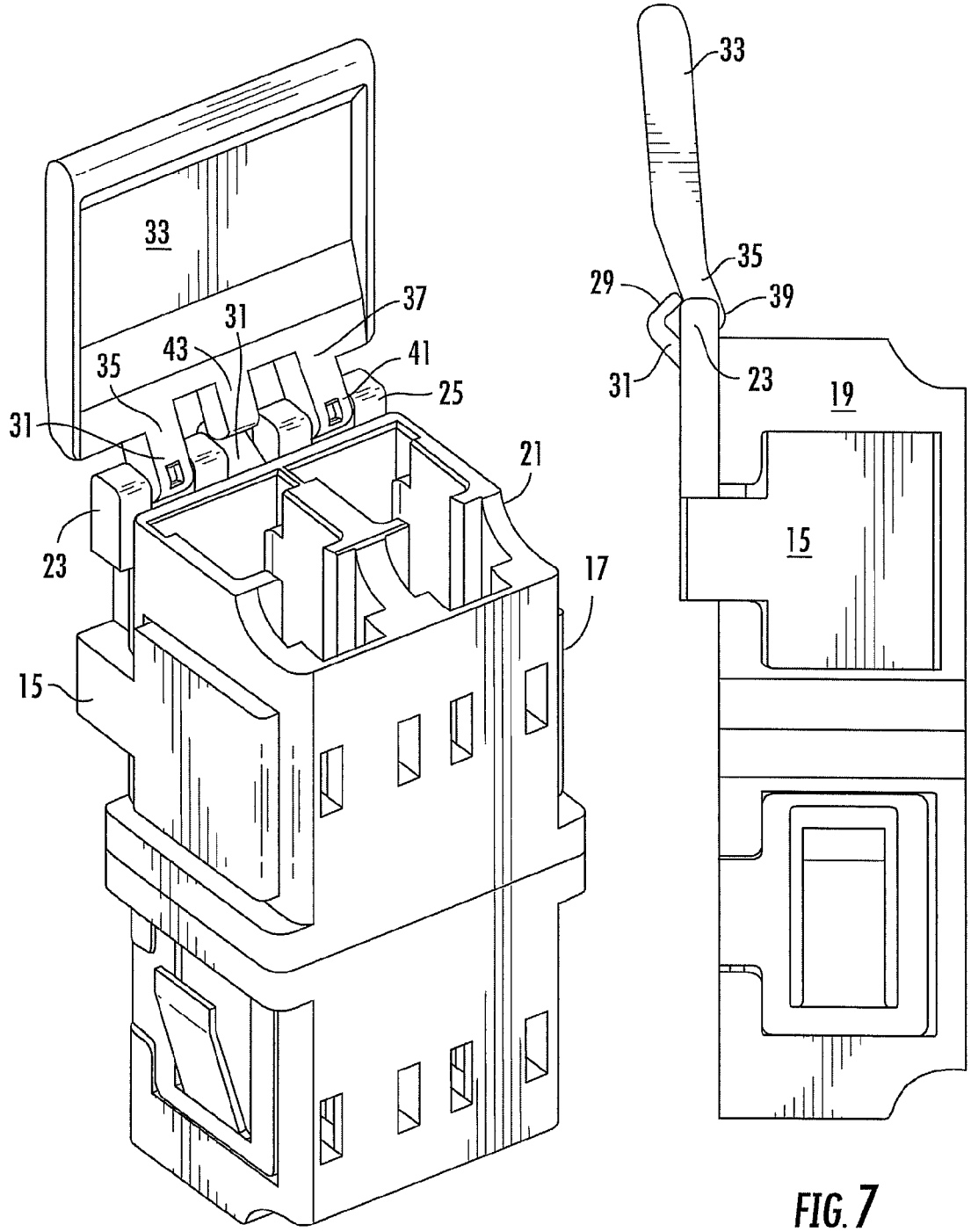
FIG. 6 is a front perspective view of the shuttered adapter of the present invention with the door opened approximately ninety degrees relative to the adapter.
FIG. 7 is a side view of the shuttered adapter of the present invention with the door fully opened.

As best seen in FIG. 7, when a person manually applies a force tending to open the door 33, the middle projection 43 presses against the resilient tab 27 and causes the resilient tab 27 to bend away from the adapter 11 and to protrude slight away from a plane of the backside of the retainer 13. FIG. 5 illustrates the door 33 at an angle of about forty five degrees relative to the adapter's jack-side face. FIG. 6 illustrates the door 33 at an angle of about ninety degrees relative to the adapter's jack-side face. FIG. 7 illustrates the door 33 at full extension to allow a second connector (e.g., a mating fiber optic connector) to be inserted into an opening of the adapter 11. Full extension results in an angle of about one hundred degrees between the door 33 and the jack-side face of the adapter 11.

Once a second connector is inserted into the opening in the adapter 11 and the manual force applied to the door 33 is released, the door 33 will press against the side of the mated, second connector. After the second connector is removed from the opening in the adapter 11, the door 33 will automatically resume its first or closed position under the applied biasing force of the resilient tab 27. In the first position, the door 33 completely, or at least substantially, covers the opening in the adapter 11, which prevent debris from entering into the adapter 11 and prevents dangerous laser light from escaping from an unmated adapter 11, which could potentially damage the eyesight of a person.

Although the present invention has been described in combination with a jack or adapter 11, it should be appreciated that the present invention may include only a retrofit kit, e.g. the door 33 and the retainer 13, for attachment to an existing jack or adapter.

Only two molding tools are needed to form one embodiment of the shutter assembly of the present invention (e.g., one tool for the retainer 13 and one tool for the door 33). Because of the layouts of the structural features of the retainer 13 and the door 33, both tools are straight-pull tools (e.g., no slides are needed in the molding process).

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

We claim:

1. A shutter assembly for a communications connector comprising:
   a retainer for attachment to a connector;
   at least one first hinge portion formed as a feature of said retainer;
   a door;
   at least one second hinge portion integrally formed as a feature of said door, wherein said at least one second hinge portion is attached to said at least one first hinge portion to permit said door to pivot relative to said retainer; and
   a resilient tab formed as a feature of one of said retainer and said door, wherein said resilient tab engages the other of said retainer and said door to urge said door into a first position relative to said retainer, wherein when said door is in said first position, said door substantially covers an opening to the connector for receiving a mating connector.

2. The shutter assembly of claim 1, wherein said retainer is formed of plastic, and wherein said resilient tab is integrally formed as a feature of said retainer during an initial molding process of said retainer.

3. The shutter assembly of claim 1, wherein said retainer is formed of plastic, and wherein said at least one first hinge portion is integrally formed as a feature of said retainer during an initial molding process of said retainer.

4. The shutter assembly of claim 3, wherein said resilient tab is integrally formed as a feature of said retainer during the initial molding process of said retainer.

5. The shutter assembly of claim 4, wherein said door is formed of plastic, and wherein said at least one second hinge portion is integrally formed as a feature of said door during an initial molding process of said door.

6. The shutter assembly of claim 5, wherein said at least one first hinge portion includes a cylindrical portion, and wherein said at least one second hinge portion includes a semi-circular gripping portion snapped about said cylindrical portion.

7. The shutter assembly of claim 5, wherein said resilient tab includes a bent tip engaging a top surface of said door.

8. The shutter assembly of claim 1, wherein said door is formed of plastic, and wherein said at least one second hinge portion is integrally formed as a feature of said door during an initial molding process of said door.

9. The shutter assembly of claim 1, wherein said resilient tab is a feature of said retainer, and wherein said resilient tab resists movement of said door away from said first position due to a natural resiliency of a material composing said resilient tab.

10. The shutter assembly of claim 9, wherein said resilient tab includes a bent tip engaging a top surface of said door.

11. The shutter assembly of claim 1, wherein said at least one first hinge portion includes a cylindrical portion.

12. The shutter assembly of claim 11, wherein said at least one second hinge portion includes a semi-circular gripping portion snapped about said cylindrical portion.

13. The shutter assembly of claim 1, wherein said at least one second hinge portion is directly attached to said at least one first hinge portion.

14. A shutter assembly for a communications connector comprising:
   a retainer for attachment to a connector;
   at least one first hinge portion formed as a feature of said retainer;
   a door;
   at least one second hinge portion integrally formed as a feature of said door, wherein said at least one second hinge portion is attached to said at least one first hinge portion to permit said door to pivot relative to said retainer; and
   a resilient tab formed as a feature of one of said retainer and said door, wherein said resilient tab engages the other of said retainer and said door to urge said door into a first position relative to said retainer, wherein said retainer is formed of plastic and includes first and second facing lips, and wherein said first and second facing lips are resiliently pushed apart for accepting a connector therebetween.

15. A communications connector comprising:
   a connector body presenting an opening for receiving a mating connector; and a shutter assembly for covering said opening, said shutter assembly including:
   a retainer attached to said connector body;
   at least one first hinge portion formed as a feature of said retainer;
   a door;
   at least one second hinge portion integrally formed as a feature of said door, wherein said at least one second hinge portion is attached to said at least one first hinge portion to permit said door to pivot relative to said retainer; and
   a resilient tab formed as a feature of one of said retainer and said door, wherein said resilient tab engages the other of said retainer and said door to urge said door into a first position relative to said retainer, wherein when said door is in said first position, said door substantially covers said opening in said connector body.

16. The communications connector of claim 15, wherein said retainer is formed of plastic, and wherein said resilient tab is integrally formed as a feature of said retainer during an initial molding process of said retainer.

17. The communications connector of claim 16, wherein said door is formed of plastic, and wherein said at least one second hinge portion is integrally formed as a feature of said door during an initial molding process of said door.

18. The communications connector of claim 15, wherein said resilient tab is a feature of said retainer, and wherein said resilient tab resists movement of said door away from said first position due to a natural resiliency of a material composing said resilient tab.

19. The communications connector of claim 15, wherein said at least one second hinge portion is directly attached to said at least one first hinge portion.

20. A communications connector comprising:
   a connector body presenting an opening for receiving a mating connector; and
   a shutter assembly for covering said opening, said shutter assembly including:
      a retainer attached to said connector body;
      at least one first hinge portion formed as a feature of said retainer;
      a door;
      at least one second hinge portion integrally formed as a feature of said door, wherein said at least one second hinge portion is attached to said at least one first hinge portion to permit said door to pivot relative to said retainer; and
      a resilient tab formed as a feature of one of said retainer and said door, wherein said resilient tab engages the other of said retainer and said door to urge said door into a first position relative to said retainer, wherein said retainer is formed of plastic and includes first and second facing lips, and wherein said first and second facing lips are resiliently pushed apart so as to respectively engage opposing sidewalls of said connector body.

* * * * *